United States Patent
Salmons et al.

(10) Patent No.: US 7,272,939 B2
(45) Date of Patent: Sep. 25, 2007

(54) COOLING SYSTEM

(75) Inventors: James C. Salmons, Kansas City, MO (US); Brian M. Schnepf, Shawnee, KS (US)

(73) Assignee: Preston Refrigeration, Kansas City, KS (US)

(*) Notice: Subject to any disclaimer, the term of this patent is extended or adjusted under 35 U.S.C. 154(b) by 453 days.

(21) Appl. No.: 10/835,156

(22) Filed: Apr. 29, 2004

(65) Prior Publication Data
US 2005/0241322 A1 Nov. 3, 2005

(51) Int. Cl.
F25D 25/00 (2006.01)
F25D 17/04 (2006.01)
F25D 17/06 (2006.01)
F25D 23/12 (2006.01)
F25D 21/00 (2006.01)

(52) U.S. Cl. ............... 62/62; 62/416; 62/419; 62/263; 62/272

(58) Field of Classification Search ............ 62/93, 62/259.1, 263, 407, 416, 419, 62, 63, 89, 62/272, 414
See application file for complete search history.

(56) References Cited

U.S. PATENT DOCUMENTS

| 2,315,285 A | 3/1943 | Dennington | 62/264 |
| 2,971,350 A | 2/1961 | Mills | 62/272 |
| 3,501,926 A | 3/1970 | Smith | 62/263 |
| 3,521,459 A * | 7/1970 | Rath | 62/78 |
| 4,561,265 A | 12/1985 | Cardiff | 62/419 |
| 6,266,973 B1 | 7/2001 | Salmons | 62/416 |

FOREIGN PATENT DOCUMENTS

FR 625632 12/1926

* cited by examiner

*Primary Examiner*—Cheryl Tyler
*Assistant Examiner*—B. Clayton McCraw
(74) *Attorney, Agent, or Firm*—Michael Williamson; Polsinelli Shalton Flanigan Suelthaus

(57) ABSTRACT

There is a cooling system and method for its use that cools carcasses prior to their being placed into cold storage units, such as refrigeration units or freezers. The cooling system includes cooling units having a wall therein, to redirect airflow in a circular pathway from a first side of the wall to a second side of the wall. The cooling unit includes at least one cooling apparatus positioned proximate the first side of wall, for directing airflow of cooled air produced in the cooling apparatus, vertically downward in a direction toward the floor, and over the animal carcass. The wall is above the floor, such that this cooled air moves from the first side of the wall to the second side of the wall, and completes the circular pathway by returning to the area proximate to the cooling apparatus. An apparatus for creating condensation can be placed on the second side of the wall, such that condensation falls to the floor, and not into contact with the animal carcasses.

42 Claims, 3 Drawing Sheets

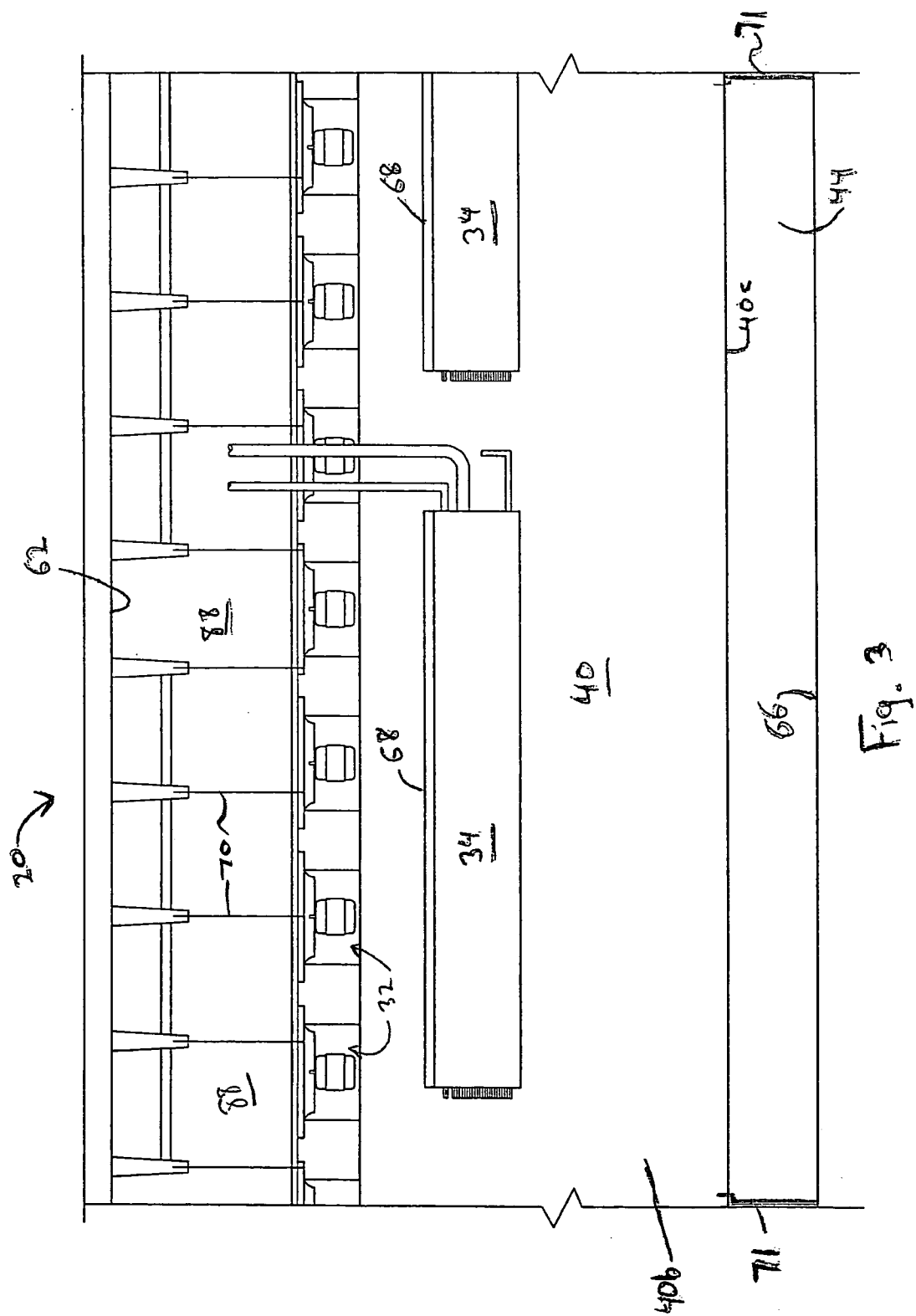

COOLING SYSTEM

FIELD OF THE INVENTION

The present invention is directed to cooling units for use with refrigeration and freezer systems. In particular, the present invention is directed to cooling units that will cool a freshly slaughtered carcass, such that once placed into an existing refrigeration or freezer system, the carcass will not cause water condensation on the ceiling of the refrigeration or freezer system.

BACKGROUND OF THE INVENTION

Cattle and hogs are typically slaughtered at a packing plant. When the animals are slaughtered, various parts of the animal are removed. Eventually, a carcass remains, which will then be butchered for the various cuts of meat. The carcasses are typically refrigerated or frozen and ultimately placed into refrigeration systems or freezers at the packing plant, prior to being divided.

The carcasses are cooled in refrigeration units. In these refrigeration units, water or mist is sprayed onto the carcasses to prevent dehydration of the meat, known in the industry as shrink. The heat from the carcasses causes some of the water to evaporate. The evaporated water is then conveyed throughout the refrigeration unit by the circulating air. As such, some of the water condenses and collects on the ceiling of the refrigeration unit.

The continued collection of moisture may reach a point where water drips downward from overhead pipes or other structures, that may be oxidized. Water falling from these structures will contaminate the meat in accordance with United States Department of Agriculture (USDA) Regulations. The affected carcasses will not be saleable, and the refrigeration unit will be closed, until sanitized and returned to compliance with USDA specifications. This is expensive and costly to packing plant owners, as they lose the actual carcasses, but also time in not processing carcasses as a result of the preparations in returning the refrigeration unit into compliance with USDA regulations.

The refrigeration system disclosed in commonly owned U.S. Pat. No. 6,266,973, incorporated by reference herein, solves the aforementioned problems. However, it is a system that is completely retrofitted into existing packing plants, or built as original equipment into new packing plants. Many packing plants have existing refrigeration and/or freezer systems, for which they have expended large sums of money. However, many of these plants lack the funding or the space for such a refrigeration system. Since these plants would like to use their existing refrigeration or freezer systems, but need the carcasses cooled, so they can be stored therein, these plant operators are in need of a suitable cooling unit for cooling carcasses prior to being placed in their existing refrigeration or freezer systems.

SUMMARY OF THE INVENTION

The present invention improves on the contemporary art by providing a cooling system of cooling units and methods for cooling carcasses. The cooling units and methods for their use, cool animal carcasses to a skin depth, such that when these carcasses are subsequently placed into the existing refrigeration or freezer system, the carcasses will not release heat sufficient to cause condensation in the refrigeration or freezer system. Additionally, the cooling units are designed such that when cooling the carcasses therein, prior to placement in the refrigeration or freezer system, the cooling process will not result in water condensation on the ceiling of the cooling unit, or any other location in the cooling unit, where falling condensate could come into contact with the carcass, resulting in its contamination in accordance with USDA regulations.

The cooling units of the invention include single or multiple cooling apparatus, for example, hot box units, for directing cooled air over a carcass in a direction at least substantially parallel, and typically parallel, to the axial direction in which the carcass is hanging. The orientation of each cooling apparatus, coupled with a wall, that divides each cooling unit into two chambers, one for the carcass and one being open, facilitates a circular air flow. This circular air flow is from the cooling apparatus, over the carcass in the carcass chamber, into the open chamber and back to the cooling apparatus, typically at an area above the cooling apparatus. This structure allows a carcass to cool to a skin depth, sufficient such that when placed into a cold storage unit, the carcass will not emit heat that causes condensation in the cold storage unit. Additionally, the aforementioned structure provides a pathway for air circulation in the cooling unit that prevents water condensation from forming on the ceiling of the cooling unit.

There is disclosed an embodiment of a method for cooling at least one animal carcass. This method includes placing a wall to divide a room into a first area and a second area, the first area defining a space for accommodating at least one animal carcass, with a portion of the wall extending downward but not into contact with a floor of the room. At least one animal carcass is passed through the first area, and cooled air is blown downward over the at least one carcass in a direction at least substantially parallel to the axial orientation of the at least one animal carcass. This creates a circular air flow, that once beyond the at least one carcass moves from the first area to the second area.

Also disclosed is an embodiment of a method for cooling at least one animal carcass, where a wall is placed to define a first area and a second area. The first area defines a space for accommodating at least one animal carcass, and the wall extends downward to facilitate air flow between the first area and the second area. At least one animal carcass is moved past at least one cooler in the first area. The at least one carcass is cooled by creating a circular air flow by blowing cooled air from the at least one cooler over the at least one carcass, from the first area into the second area. The circular air flow moves from the first area to the second area once beyond the at least one carcass, and moisture is removed from the circular air flow in the second area.

Another embodiment is a method for cooling at least one animal carcass. This method includes, placing a wall for defining a first area and a second area, the first area defining a space for accommodating at least one animal carcass, with the wall extending downward to facilitate air flow between the first area and the second area. At least one animal carcass is obtained for the first area. A circular air flow is created from the first area into the second area, by moving cooled air into the first area over the at least one animal carcass in a direction at least substantially parallel to the axial orientation of the at least one animal carcass, and, moving the air from the first area to the second area. The circular air flow is subjected to condensation in the second area.

There is also an embodiment directed to a cooling unit for cooling animal carcasses. The cooling unit includes a floor, a ceiling, and side walls at least substantially perpendicular to the floor and the ceiling. The cooling unit includes a wall intermediate the sidewalls defining a first area and a second area in the cooling unit, and at least a first portion of the wall is positioned at least substantially perpendicular to the floor and the ceiling. There is at least one cooling apparatus in communication with the wall, the at least one cooling apparatus configured to direct cooled air vertically downward in the first area toward the floor and in a direction at least substantially parallel to the direction of the at least a portion of the wall. The at least a first portion of the wall extends downward toward the floor to define an open space between the end of the wall and the floor. This causes the cooled air to flow in a circular motion between the first area and the second area.

There is also disclosed an embodiment of cooling unit for cooling animal carcasses, the cooling unit including a floor, a ceiling, and side walls at least substantially perpendicular to the floor and the ceiling. The cooling unit has a wall intermediate the sidewalls defining a first area and a second area in the cooling unit, and at least a first portion of the wall is positioned at least substantially perpendicular to the floor and the ceiling. There is at least one cooling apparatus in communication with the wall, the at least one cooling apparatus configured to direct cooled air vertically downward in the first area toward the floor and in a direction at least substantially parallel to the direction of the at least a portion of the wall. The wall is such that the at least a first portion of the wall extends downward toward the floor to define an open space between the end of the wall and the floor, for causing the cooled air to flow in a circular motion between the first area and the second area.

There is disclosed an embodiment of a cooling unit. The cooling is for cooling animal carcasses, has a floor and is formed of a wall defining a first area and a second area, and at least one cooling apparatus, for example, a hot box unit, in communication with the wall. The at least one cooling apparatus is configured to direct cooled air vertically downward in the first area toward the floor. The wall is positioned to cause the cooled air to flow in a circular motion between the first area and the second area, and at least a portion of the wall extends downward toward the floor, to define an open space between the end of the wall and the floor. An apparatus that causes condensation when contacted by the flowing cooled air is in the second area.

Another embodiment is directed to a cooling unit for cooling animal carcasses. The cooling unit includes a floor and a wall defining a first area and a second area, the wall includes a portion oriented at least substantially vertically. There is at least one cooling apparatus in communication with the wall, the at least one cooling apparatus oriented to direct cooled air vertically downward toward the floor in the first area, in a direction at least substantially parallel to the portion of the wall oriented at least substantially vertically. The wall is positioned to cause the cooled air to flow in a circular motion between the first area and the second area to a point proximate to the cooling apparatus and, the portion of the wall that is oriented at least substantially vertically extends downward toward the floor to define an open space between the end of the wall and the floor of the cooling unit. There is also an apparatus configured for causing condensation when contacted by the cooled air flowing in the second area, and there is a system for delivering at least one animal carcass into the first area.

Also disclosed is an embodiment having a wall designed to redirect airflow in a cooling unit. The cooling unit has a floor, a ceiling, and at least one cooling apparatus, for example, a hot box unit, suspended from the ceiling. The at least one cooling apparatus is in communication with a first side of the wall and oriented to direct cooled air in a direction at least substantially parallel with the wall toward the floor. The wall is supported by supports that extend upward from the floor, and the wall is positioned to cause the cooled air to flow in an area bounded by the second side of the wall, after it has initially flowed toward the floor in an area bounded by the first side of the wall.

Another embodiment is directed to a cooling system for cooling animal carcasses having a plurality of cooling units. Each of the cooling units includes a wall defining a first area and a second area, at least one cooling apparatus in communication with the wall, the at least one cooling apparatus configured to direct cooled air vertically downward in the first area toward the floor of the respective unit, and the wall is positioned to cause the cooled air to flow in a circular motion between the first area and the second area. At least a portion of the wall extends downward toward the floor to define an open space between the end of the wall and the floor, and there is at least one movement system for transporting carcasses through the system.

Another embodiment is directed to a system for cooling animal carcasses. The system includes a wall defining a first area and a second area, the wall including a portion oriented at least substantially vertically. There is also a plurality of cooling apparatus, each of the cooling apparatus are in communication with the wall and are configured to direct cooled air vertically downward in the first area toward a floor, in a direction at least substantially parallel to the vertically oriented potion of the wall, and the wall is positioned to cause the cooled air to flow in a circular motion between the first area and the second area. The at least a portion of the wall oriented at least substantially vertically extends downward toward the floor, to define an open space between the end of the wall and the floor, and there are a plurality of apparatus configured for causing condensation when contacted by the cooled air flowing in the second area.

Another embodiment is directed to a method for directing airflow in a chamber formed of oppositely disposed walls, bounded by a floor and a ceiling. The method includes positioning a wall intermediate the oppositely disposed walls, the intermediate wall extending to facilitate air flow over the intermediate wall, between the intermediate wall and the ceiling, and under the intermediate wall, between the intermediate wall and the floor. The intermediate wall defines a first area and a second area. Cooled air is emitted into the first area in a direction at least substantially parallel to the intermediate wall, such that the air flows in a circular air stream from the first area, under the intermediate wall, and into the second area. Moisture is then removed from the air stream.

Another embodiment is directed to a method for directing airflow in a chamber for cooling at least one animal carcass therein. The chamber is formed of oppositely disposed walls, bounded by a floor and a ceiling. The method includes positioning a wall intermediate the oppositely disposed walls, the intermediate wall extending to facilitate air flow over the intermediate wall, between the intermediate wall and the ceiling and under the intermediate wall, between the intermediate wall and the floor, the intermediate wall defining a first area and a second area. Cooled air is emitted in a direction at least substantially parallel to the intermediate wall, such that the air flows in a circular air stream from the first area, under the intermediate wall and into the second area, and at least one animal carcass is moved into the first area in a direction at least substantially perpendicular to the movement direction of the carcass. Moisture is then removed from the air stream, typically in the second area.

Another embodiment is directed to a method for cooling. The method includes blowing cooled air, from a cooler, over at least one carcass in a direction at least parallel to the axial orientation of the carcass. This typically results in moisturized air forming, when the cooled air contacts the carcass. The moisturized air is passed through a condenser to remove the moisture, and form dry air. The dry air is passed through the cooler to form the cooled air.

BRIEF DESCRIPTION OF THE DRAWINGS

Attention is now directed to the drawing figures, where like or corresponding numerals or characters indicate like or corresponding components. In the drawings:

FIG. 3 is a rear view of the system of the invention with the rear wall removed.

DETAILED DESCRIPTION OF THE DRAWINGS

The present invention relates to a cooling system and methods for cooling a freshly slaughtered carcass to a skin depth such that when placed into an existing refrigeration or freezer unit, condensation above the carcass, as a result of the cooled carcass being placed therein, will not result. This method is accomplished by a cooling unit of a structure including a wall placed in the unit for redirecting airflow in a manner that allows for sufficient cooling of a carcass while prohibiting condensation on the ceiling of the cooling unit.

Figure 1:
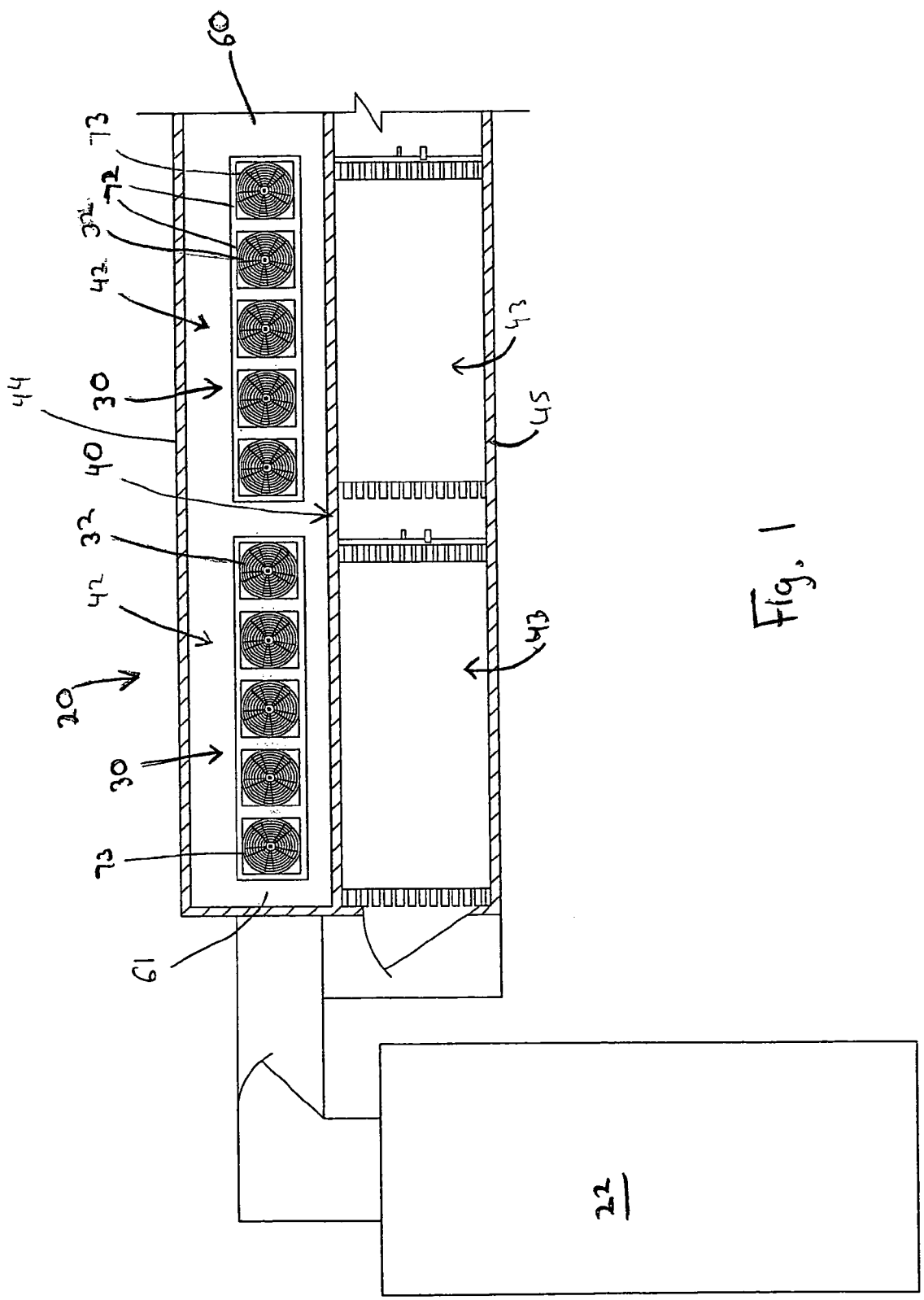
FIG. 1 is a top view of the system of the present invention in operation with an existing cold storage unit.

FIG. 1 shows the cooling system 20 of the present invention in use with an existing cold storage unit 22 in a packing plant or the like. The cold storage unit 22 is typically a refrigeration unit, in the case of beef carcasses, or a freezer unit, in the case of pork carcasses. The cooling system 20 is formed of cooling units 30. Each cooling unit 30 has a hot box cooling device 32, for propelling the cooled or refrigerated air to cool the carcasses, coupled with a refrigeration coil unit 34, formed of coils 34a, to generate the cooled or refrigerated air.

A divider wall 40 separates the hot box cooling device 32 and the refrigeration coil unit 34. The divider wall 40 defines a first chamber 42 and a second chamber 43 for air circulation in each cooling unit 30. The divider wall 40, coupled with the respective lateral walls 44, 45, serve as boundaries for the first 42 and second 43 chambers.

Figure 2:
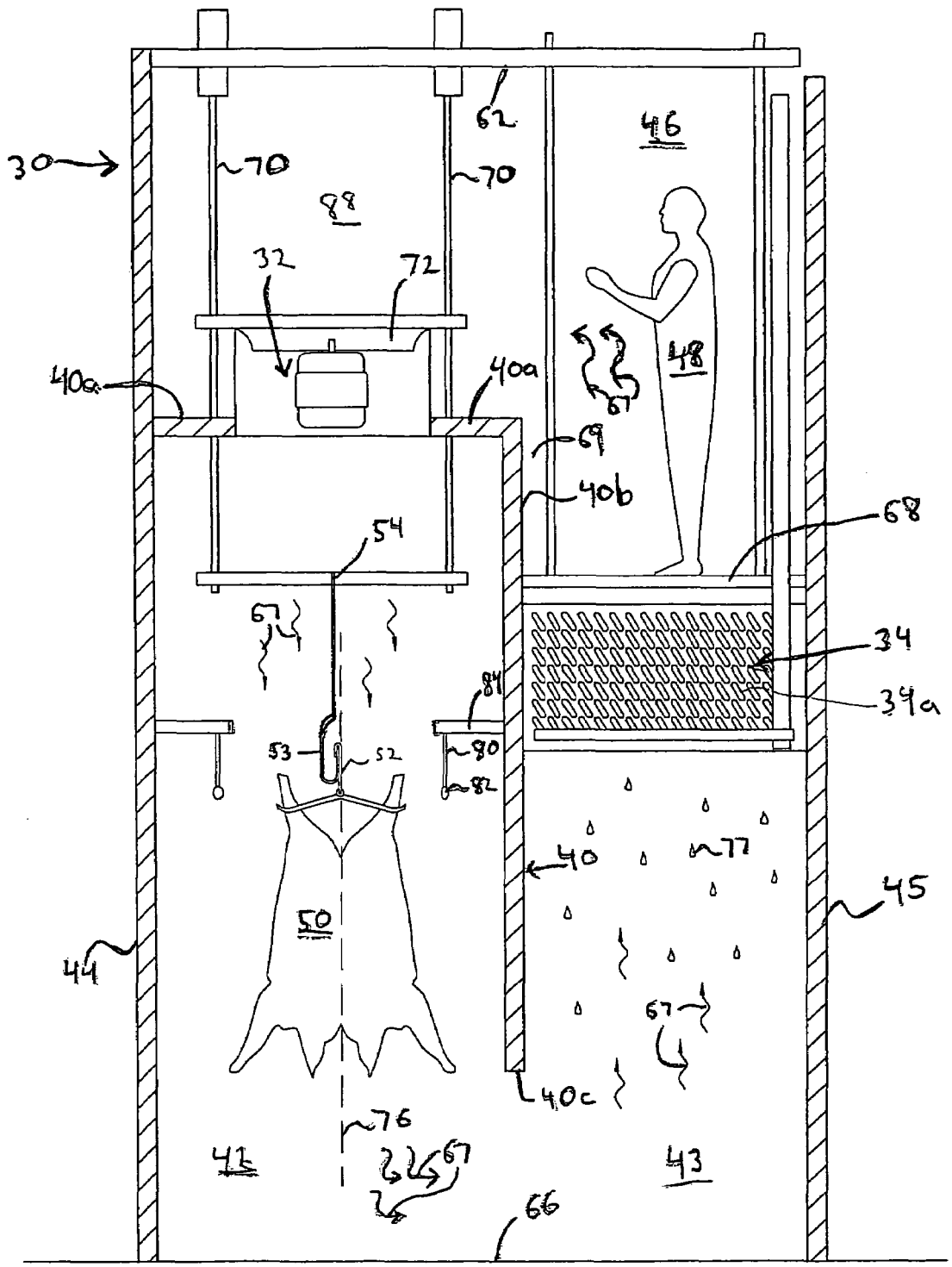
FIG. 2 is a cross sectional partial view of a unit of the system of the present invention.

Turning also to FIG. 2, there is also a service area 46 for each unit 30, with space suitable for a human attendant 48. The refrigeration coil unit 34 typically extends to cover four hot box cooling devices 32. While two refrigeration units 30, each unit of four hot boxes 32 and one refrigeration coil unit 34, are shown, this is exemplary only. Any number of units 30, with any number of hot boxes 32 and refrigeration coil units 34 are sufficient, provided they can achieve the desired cooling of the carcasses 50.

Within each cooling unit 30, the carcasses 50 are mounted on meat hooks 52, attached to hooks 53 of conveyer belts 54 of conveyer belt systems. For example, a conveyer belt 54 is arranged under the hot boxes 32 of each unit 30. The carcasses 50 are placed into the system 20 at a first end 60 and are transported through the system 20 (through the first or carcass chamber 42) to the opposite end 61 by the conveyer belt 54. The now cooled carcasses 50 can then be transferred to the cold storage unit 22. The unit 30 is bounded by a ceiling 62, the lateral walls 44, 45 and a floor 66.

The divider wall 40, intermediate the lateral walls 44, 45, is located in a position proximal to the hot boxes 32. The divider wall 40 is formed of a horizontal portion 40a, and a vertical portion 40b, that terminates at an end 40c. The divider wall 40 is positioned to allow refrigerated air from the hot boxes 32, that has passed downward, over the animal carcasses 50, in the first or carcass chamber 42, to travel into the second chamber 43, also known as the open chamber, before moving upward toward the hot box 32. Accordingly, the refrigerated air circulates along a path defined by the arrows 67 of FIG. 2.

The end 40c of the divider wall 40 is, for example, three to six feet from the floor 66. However, any distance is permissible, as long as sufficient air circulation occurs, whereby air initially passing downward over the carcasses 50, is not forced to return upward, over the carcasses 50 to the ceiling 62 (in the first chamber 42). The desired air flow is along a circulation path detailed above, that is indicated by the arrows 67 of FIG. 2. The air flow and circulation path in the cooling unit 34 is achieved by placing the wall 40 in a position, whereby it seals or occupies space between the hot boxes 32 themselves, and between the hot boxes 32 and the boundary wall 44. The service area 46 includes a grated floor 68, that is positioned over the refrigeration coil unit 34, both the grated floor 68 and refrigeration coil unit 34 having with openings sized sufficiently to allow for the passage of air therethrough, to complete the circulation path in the second chamber 43, back to the hot boxes 32. There is also a gap 69 between the service area 46 and the wall 40, that is also part of the circulation path back to the hot boxes 32.

The wall 40, as well as boundary walls 44, 45, can be constructed of materials that prevent blood or animal waste from readily collecting or attaching thereto. Any variety of materials can be used to form the walls 40, 44, 45, including plywood, wood, cork, and any variety of other materials. The walls 40, 44, 45 are solid structures, without voids or holes. The walls 40, 44, 45 can also be laminated or coated with a material that prevents the ready attachment of animal waste.

The wall 40 is supported from the ceiling 62 (and attached thereto along its horizontal portion 40a) by tee saddles 70. The wall 40 may also include one or more support structures 71, that seat under the end 40c of the wall 40. These support structures are positioned to allow air to flow from the first or carcass chamber 42 into the second or open chamber 43, in accordance with the aforementioned circulation path. The support structure(s) can be rods, bars, or any other structures capable of supporting the wall 40 while allowing for proper air circulation.

The hot box 32 typically includes a cooling apparatus or cooler 72 (of which the refrigeration coil unit 34 is a part of) in close proximity to a fan (exhaust fan) 73 (FIG. 1), for propelling cooled air from the cooling apparatus (cooler) 72 over the carcass 50. The hot box 32 is oriented such that the fan 73 forces (blows) the refrigerated or cooled air vertically downward toward the floor 66, in a direction substantially parallel, and typically parallel, to the axial direction of the carcass 50, as represented by the axis 76. This vertically downward direction is also substantially parallel, and typically parallel, to the vertical portion 40b of the wall 40.

The refrigeration coil unit 34 is located in the second or open chamber 43. This coil unit 34 is positioned in this second or open chamber 43, such that condensation (shown by the drops 77) from the circulated air collects on the coils 34a, and falls onto the floor 66 of the open chamber 43, so as not to contact the carcass 50. This arrangement prevents condensation from reaching the ceiling 62.

The hot box 32 is typically suspended from the ceiling 62 by the tee saddles 70 or other suitable suspension structures. This tee saddle suspension is the same for the grated floor 64 and refrigeration coil unit 34.

The hot boxes 32 and refrigeration coil units 34 should be such that they can provide and circulate refrigerated air suitable for cooling a carcass to a skin depth of, for example, approximately 2 inches (approximately 5 cm) in approximately 4 hours. By cooling a freshly slaughtered carcass to a skin depth of approximately 2 inches, the carcass 50 will not release steam when placed into the cold storage unit 22, for example, a refrigeration unit (if a beef carcass) or freezer unit (if a pork carcass). This will eliminate any potential condensation in the refrigeration or freezer units.

The units 30 also include spraying units 80, with spray heads 82, whose supply pipes 84 extend from the lateral 44 and divider 40 walls. These spraying units 80 provide water or mist to the carcasses 50, to prevent dehydration during the cooling process. These spraying units 80 and supply pipes 84 are typically made of stainless steel or other corrosion or oxidation resistant material.

An exemplary operation of the system 20 will now be described with reference to FIGS. 1-3. Initially, carcasses 50 are placed on meat hooks 52, that attach to hooks 53 of a conveyer belt 54. The conveyer belt 54 transports the carcasses 50 into the system 20, through the first end 60. The carcasses 50 are now in each cooling unit 30 of the system 20.

Cooling of the carcasses 50 to the desired skin depth, occurs as the fans 73 of the hot boxes 32 force refrigerated or cooled air that is dry (free of moisture), discharged from the cooling apparatus 72, vertically downward, toward the floor 66, in a direction at least substantially parallel, and typically parallel, to the vertical portion 40b of the wall 40. This airflow from the fan 73 travels over the carcasses 50 in a direction that is substantially parallel, and typically parallel, to the axial orientation of the carcasses 50. The refrigerated air, that passes over the carcasses 50, then travels toward the floor 66 (in accordance with the arrows 67). This refrigerated air, upon passing over the carcass acquires moisture, as a result of the temperature differential between the air and the skin temperature of the carcass.

The positioning of the divider wall 40 causes the refrigerated and now moisturized air to flow under the divider wall 40 and into the open chamber 43 (in accordance with the arrows 67), where it travels upward (as per the arrows 67). Upon moving upward in the second chamber 43, the moisturized air contacts the coils 34a of the refrigerator coil unit 34 and condenses. The condensation is in the form of water, that drips onto the floor 66 (shown by droplets 77), where it collects on the floor 66.

With the moisture removed from the circulating air, the air is again dry air. As this dry air travels in the circulation path, it continues to rise, as it is propelled upward by force from the fan 73. The circulating dry air then travels through the refrigerator coil unit 34, grated floor 68 and the gap 69, ultimately completing the circulation path by returning to the space 88 above the hot box 32. By returning to the hot box 32 as dry air, condensation does not build up on the ceiling 62 of the unit 30. The aforementioned process is continuous, and can be performed for as long as desired.

There has been shown and described at least one preferred embodiment of a cooling system. It is apparent to those skilled in the art, however, that many changes, variations, modifications, and other uses and applications for the system and its components are possible, and also such changes, variations, modifications, and other uses and applications which do not depart from the spirit and scope of the invention are deemed to be covered by the invention, which is limited only by the claims which follow.

What is claimed is:

1. A method for cooling at least one animal carcass comprising:
   placing a wall to divide a room comprising a ceiling, two lateral walls, and a floor into a first area and a second area, the first area defining a space for accommodating at least one animal carcass and comprising a hot box cooling device, the second area defining a space comprising a refrigeration coil unit, a portion of the wall extending downward but not in contact with a floor of the room;
   passing at least one animal carcass through the first area; and,
   blowing cooled air downward through the hot box cooling device over the carcass in a direction at least substantially parallel to the axial orientation of the carcass to create a circular air flow that once beyond the carcass moves from the first area to the second area.

2. The method of claim 1, wherein the air flows in the second area flows back to where the circular air flow is created.

3. The method of claim 1, further comprising: removing moisture from the circular air flow in the second area through the refrigeration coil unit.

4. The method of claim 1, wherein placing the wall includes placing the wall such that the portion of the wall extending downward is at least substantially perpendicular to the floor, such that the portion of the wall extending downward is at least substantially parallel to the axial orientation of the at least one animal carcass.

5. The method of claim 1, wherein the wall is formed from plywood, wood, cork, and any of a variety of other materials that are laminated or coated with a material that prevents the ready attachment of animal waste.

6. A method for cooling at least one animal carcass comprising:
   placing a wall for defining a first area and a second area, the first area defining a space for accommodating at least one animal carcass and comprising a hot box cooling device, the second area defining a space comprising a refrigeration coil unit, the wall extending downward to facilitate air flow between the first area and the second area;
   placing at least one animal carcass in the first area;
   cooling the carcass by creating a circular air flow by blowing cooled air from the hot box cooling device over the carcass, from the first area into the second area, the circular air flow moving from the first area to the second area once beyond the at least one carcass; and,
   removing moisture from the circular air flow in the second area through the refrigeration coil unit.

7. The method of claim 6, wherein the cooled air flow in the second area flows back to where the circular air flow is created.

8. The method of claim 6, wherein the blowing the cooled air over the at least one animal carcass is in a direction at least substantially parallel to the axial orientation of the carcass.

9. The method of claim 6, wherein the wall is formed from plywood, wood, cork, and any of a variety of other materials that are laminated or coated with a material that prevents the ready attachment of animal waste.

10. A cooling unit for cooling animal carcasses, the cooling unit including a floor, a ceiling, and side walls at least substantially perpendicular to the floor and the ceiling, comprising:
   a wall intermediate the sidewalls defining a first area and a second area in the cooling unit, and at least a first portion of the wall positioned at least substantially perpendicular to the floor and the ceiling;
   at least one hot box cooling device in the first area, the hot box cooling device configured to direct cooled air vertically downward in the first area toward the floor and in a direction at least substantially parallel to the direction of the at least a portion of the wall;
   at least one refrigeration coil unit in the second area; and,
   the first portion of the wall extending downward toward the floor to define an open space between the end of the wall and the floor, for causing the cooled air to flow in a circular motion between the first area and the second area.

11. The cooling unit of claim 10, wherein the wall is positioned to cause the cooled air to flow through the second area to a point proximate to the refrigeration coil unit.

12. The cooling unit of claim 10, wherein the wall includes a vertical member, defining the first portion of the wall, and a horizontal member, defining a second portion of the wall.

13. The cooling unit of claim 10, wherein the refrigeration coil unit is configured for causing condensation when contacted by the cooled air, in the second area.

14. The cooling unit of claim 13, wherein the refrigeration coil unit includes a plurality of refrigeration coils.

15. The cooling unit of claim 10, wherein the wall is formed from plywood, wood, cork, and any of a variety of other materials that are laminated or coated with a material that prevents the ready attachment of animal waste.

16. The cooling unit of claim 10, wherein the first area is in communication with a conveyor belt including a plurality of hooks, each of the hooks for carrying at least one animal carcass.

17. The cooling unit of claim 10, wherein the hot box cooling device comprises a fan for forcing cooled air from the hot box cooling device over the carcass.

18. A cooling unit for cooling animal carcasses, the cooling unit including a floor, a ceiling, and lateral walls at least substantially perpendicular to the floor and the ceiling, comprising:
   a wall defining a first area and a second area;
   at least one hot box cooling device in the first area, the hot box cooling device configured to direct cooled air vertically downward in the first area toward the floor;
   the wall positioned to cause the cooled air to flow in a circular motion between the first area and the second area, and at least a portion of the wall extending downward toward the floor to define an open space between the end of the wall and the floor of the cooling unit; and
   a refrigeration coil unit in the second area configured for causing condensation when contacted by the cooled air flowing in the second area.

19. The cooling unit of claim 18, wherein the wall is positioned to cause the cooled air to flow through the second area to a point proximate to the refrigeration coil unit.

20. The cooling unit of claim 18, wherein the wall includes a vertical member.

21. The cooling unit of claim 18, wherein the wall is formed from plywood, wood, cork, and any of a variety of other materials that are laminated or coated with a material that prevents the ready attachment of animal waste.

22. The cooling unit of claim 18, wherein the first area is configured for accommodating at least one animal carcass.

23. The cooling unit of claim 18, wherein the hot box cooling device comprises a fan for forcing cooled air from the hot box cooling device over the carcass.

24. The cooling unit of claim 18, wherein the refrigeration coil unit includes a plurality of refrigeration coils.

25. A cooling unit for cooling animal carcasses, the cooling unit including a floor, a ceiling, and lateral walls at least substantially perpendicular to the floor and the ceiling, comprising:
   a wall defining a first area and a second area, the wall including a portion oriented at least substantially vertically;
   at least one hot box cooling device in the first area, the hot box cooling device oriented to direct cooled air vertically downward toward the floor in the first area, in a direction at least substantially parallel to the portion of the wall oriented at least substantially vertically;
   at least one refrigeration coil unit in the second area;
   the wall positioned to cause the cooled air to flow in a circular motion between the first area and the second area to a point proximate to the refrigeration coil unit, and, the portion of the wall oriented at least substantially vertically extending downward toward the floor to define an open space between the end of the wall and the floor of the cooling unit;
   the refrigeration coil unit configured for causing condensation when contacted by the cooled air flowing in the second area; and,
   a system for delivering at least one animal carcass into the first area.

26. The cooling unit of claim 25, wherein the wall is formed from plywood, wood, cork, and any of a variety of other materials that are laminated or coated with a material that prevents the ready attachment of animal waste.

27. The cooling unit of claim 25, wherein the first area is configured for accommodating at least one animal carcass.

28. The cooling unit of claim 25, wherein hot box cooling device comprises a fan for forcing cooled air from the hot box cooling device over the carcass.

29. The cooling unit of claim 25, wherein the refrigeration coil unit includes a plurality of refrigeration coils.

30. A cooling system for cooling animal carcasses comprising:
   a plurality of cooling units extending along a floor, each cooling unit of the plurality of cooling units including
   a floor, a ceiling, and lateral walls;
   a wall intermediate the lateral walls defining a first area and a second area;
   at least one hot box cooling device in the first area, the hot box cooling device configured to direct cooled air vertically downward in the first area toward the floor;
   at least one refrigeration coil unit in the second area;
   the wall positioned to cause the cooled air to flow in a circular motion between the first area and the second area, and at least a portion of the wall extending downward toward the floor to define an open space between the end of the wall and the floor; and
   at least one movement system for transporting carcasses through the system.

31. The system of claim 30, wherein the wall is positioned to cause the cooled air to flow through the second area to a point proximate to the cooling apparatus.

32. The system of claim 30, wherein the refrigeration coil unit is configured for causing condensation when contacted by the cooled air flowing in the second area.

33. The system of claim 32, wherein the refrigeration coil unit includes a plurality of refrigeration coils.

34. The system of claim 30, wherein the wall is formed from plywood, wood, cork, and any of a variety of other materials that are laminated or coated with a material that prevents the ready attachment of animal waste.

35. The system of claim 30, wherein the first area is configured for accommodating at least one animal carcass.

36. The system of claim 30, wherein the hot box cooling device comprises a fan for forcing cooled air from the hot box cooling device over the carcass.

37. The system of claim 30, wherein the movement system includes a conveyor belt for transporting animal carcasses.

38. A method for directing airflow in a chamber formed of oppositely disposed walls, bounded by a floor and a ceiling, comprising:
    positioning a wall intermediate the oppositely disposed walls, the intermediate wall extending to facilitate air flow over the intermediate wall, between the intermediate wall and the ceiling, and under the intermediate wall, between the intermediate wall and the floor, the intermediate wall defining a first area and a second area;
    emitting cooled air into the first area, through a hot box cooling device in the first area, in a direction at least substantially parallel to the intermediate wall, such that the air flows in a circular air stream from the first area, under the intermediate wall, and into the second area; and
    removing moisture from the air stream through a refrigeration coil unit in the second area.

39. The method of claim 38, wherein the air stream flows from the second area to the first area by flowing over the intermediate wall.

40. A method for directing airflow in a chamber for cooling at least one animal carcass therein, the chamber formed of oppositely disposed walls, bounded by a floor and a ceiling, comprising:
    positioning a wall intermediate the oppositely disposed walls, the intermediate wall extending to facilitate air flow over the intermediate wall, between the intermediate wall and the ceiling and under the intermediate wall, between the intermediate wall and the floor, the intermediate wall defining a first area and a second area;
    emitting cooled air, through a hot box cooling device in the first area, in a direction at least substantially parallel to the intermediate wall, such that the air flows in a circular air stream from the first area, under the intermediate wall and into the second area;
    moving at least one animal carcass into the first area; and
    removing moisture from the air stream through a refrigeration coil unit in the second area.

41. The method of claim 40, wherein the air stream flows from the second area to the first area by flowing over the intermediate wall.

42. A method for cooling at least one animal carcass comprising:
    placing a wall to divide a room comprising a ceiling, two lateral walls, and a floor into a first area and a second area, the first area defining a space for accommodating at least one animal carcass, a hot box cooling device positioned proximate a first side of the wall to blow cooled air in the first area, and a refrigeration coil unit positioned on a second side of the wall, a portion of the wall extending downward but not in contact with the floor of the room;
    passing at least one animal carcass through the first area; and,
    blowing cooled air downward through the hot box cooling device over the carcass in a direction at least substantially parallel to the axial orientation of the carcass to create a circular air flow that once beyond the carcass moves from the first area to the second area.

* * * * *